US011152034B2

(12) United States Patent
Arana et al.

(10) Patent No.: US 11,152,034 B2
(45) Date of Patent: Oct. 19, 2021

(54) CHAIN-OF-MANIPULATION TRACKING OF AUDIO-VIDEO CONTENT

(71) Applicant: Disney Enterprises, Inc., Burbank, CA (US)

(72) Inventors: Mark Arana, Agoura Hills, CA (US); Edward C. Drake, Stevenson Ranch, CA (US); Anthony M. Accardo, Los Angeles, CA (US)

(73) Assignee: Disney Enterprises Inc., Burbank, CA (US)

( * ) Notice: Subject to any disclaimer, the term of this patent is extended or adjusted under 35 U.S.C. 154(b) by 0 days.

(21) Appl. No.: 16/679,016

(22) Filed: Nov. 8, 2019

(65) Prior Publication Data

US 2021/0142829 A1    May 13, 2021

(51) Int. Cl.
G11B 27/34        (2006.01)
G11B 27/036       (2006.01)
G10L 25/51        (2013.01)

(52) U.S. Cl.
CPC ............ *G11B 27/34* (2013.01); *G10L 25/51* (2013.01); *G11B 27/036* (2013.01)

(58) Field of Classification Search
CPC ........ G11B 27/34; G11B 27/036; G10L 25/51
See application file for complete search history.

(56) References Cited

U.S. PATENT DOCUMENTS

| 2012/0131002 | A1* | 5/2012 | Rakshit ............... G06F 16/78 707/736 |
| 2012/0141093 | A1  | 6/2012 | Yamaguchi et al. |
| 2013/0216201 | A1* | 8/2013 | Seligmann ......... H04N 9/8042 386/241 |

(Continued)

FOREIGN PATENT DOCUMENTS

EP        3 432 162 A1    1/2019

OTHER PUBLICATIONS

Fingas, Jon. "Adobe, Twitter and the New York Times Team up to Fight Digital Fakes." *Engadget*, Nov. 4, 2019, www.engadget.com/2019/11/04/adobe-twitter-nyt-digital-content-attribution/.

(Continued)

*Primary Examiner* — Thai Q Tran
*Assistant Examiner* — Jose M Mesa
(74) *Attorney, Agent, or Firm* — Farjami & Farjami LLP

(57) ABSTRACT

A device for use in a system for tracking a chain-of-manipulation (CoM) of audio-video (AV) content includes a hardware processor, and a system memory storing a CoM tagging software code and an AV processing application. The hardware processor executes the CoM tagging software code to detect manipulation of the AV content by the AV processing application that modifies at least one of video or audio of the AV content, and to generate, when the manipulation is detected, one or more CoM tag(s) including a device identification tag identifying the device used for modifying the AV content. The hardware processor also executes the CoM tagging software code to insert the CoM tag(s) in each modified segment of the AV content modified by the AV processing application, the inserted CoM tag(s) being human and machine imperceptible when the AV content is played back by a playback device on a display.

20 Claims, 5 Drawing Sheets

(56) References Cited

U.S. PATENT DOCUMENTS

2016/0071541 A1* 3/2016 Miner ................ G11B 27/30
                                                    386/223
2019/0267041 A1* 8/2019 Ricciardi ............ G11B 27/031

OTHER PUBLICATIONS

"Adobe, The New York Times Company and Twitter Announce Content Authenticity Initiative to Develop Industry Standard for Content Attribution." *Adobe Newsroom*, news.adobe.com/press-release/corporate/adobe-new-york-times-company-and-twitter-announce-content-authenticity.

Extended European Search Report in EP Application Serial No. 20197984.6.

"Digital video tempering detection: An overview of passive techniques" by Sitara et al. (Elsevier Ltd. 2016).

* cited by examiner

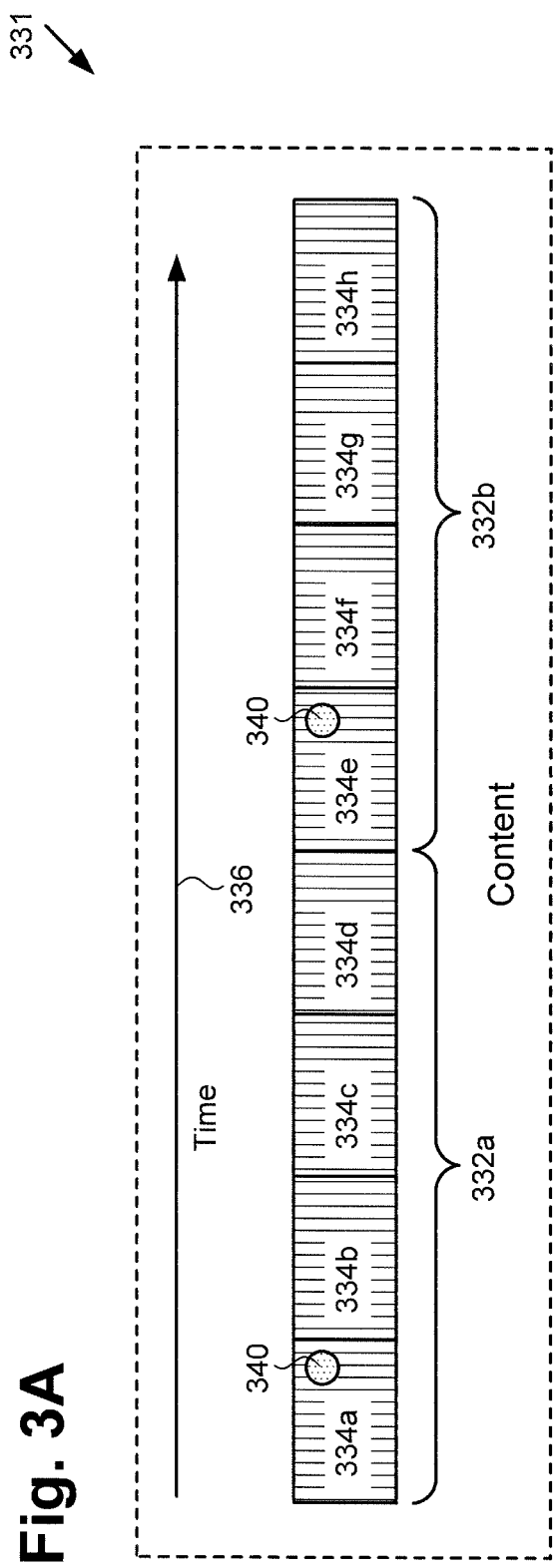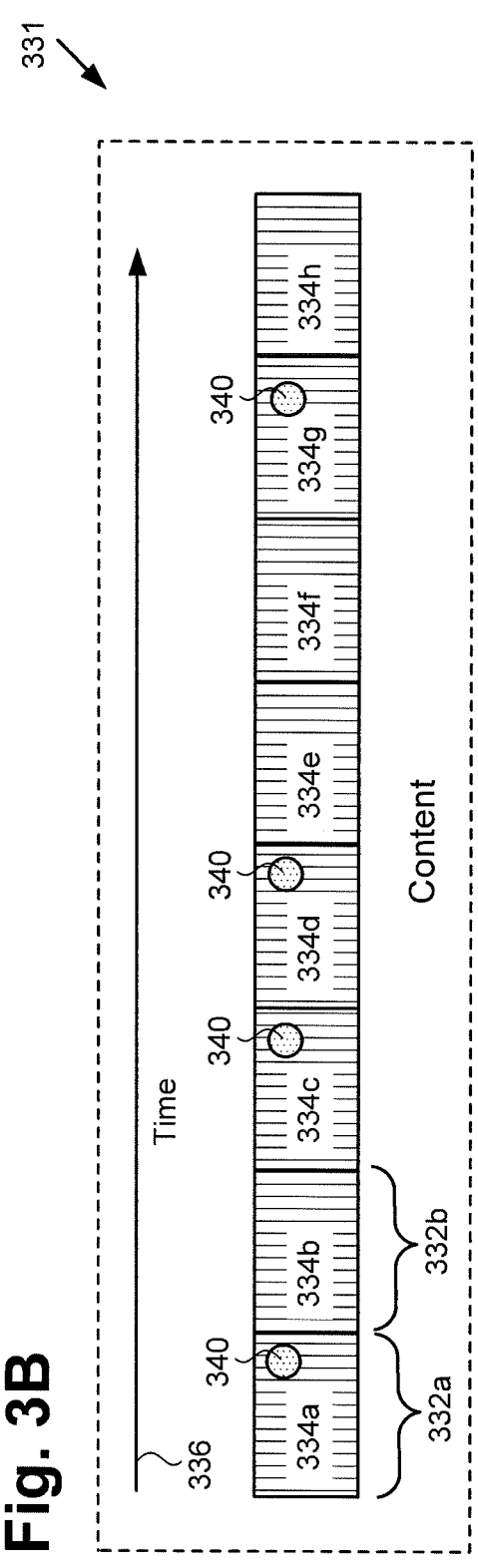

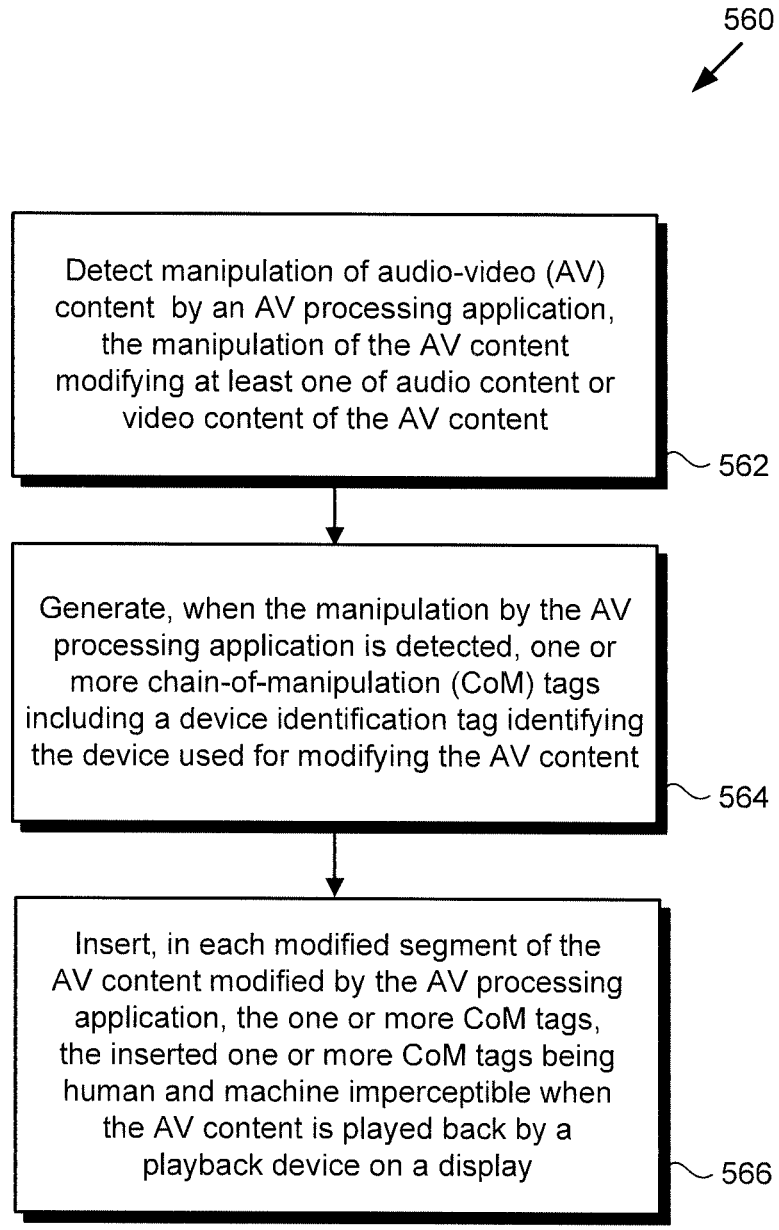

CHAIN-OF-MANIPULATION TRACKING OF AUDIO-VIDEO CONTENT

BACKGROUND

Many audio-video (AV) editing applications are presently available for use that enable the modification of originally produced AV content. In some instances, use of these editing applications is for legitimate artistic reasons. In some other instances, use of such editing applications may be largely innocuous and innocent of any ill intent. However, in some other instances, use of such editing applications to manipulate AV content can be more sinister. For example, AV content can be manipulated through the addition of false or misleading content, or through the deletion of original content to intentionally alter the context or messaging of the AV content.

Due to the widespread popularity of AV content for the distribution of entertainment and news, effective management and control of legitimately created or edited content is important to the owners and distributors of that content. However, the unauthorized manipulation of AV content described above, whether performed innocently or maliciously, is typically difficult to detect. As a result, subtly altered or even substantially "fake" content may inadvertently be used in place of original AV content or authorized modifications to that original content in violation of contractual agreement or regulatory restrictions, thereby subjecting the content owners and/or distributors to potential legal jeopardy.

SUMMARY

There are provided devices and methods for use in systems for performing automated chain-of-manipulation (CoM) tracking of audio-video content, substantially as shown in and/or described in connection with at least one of the figures, and as set forth more completely in the claims.

BRIEF DESCRIPTION OF THE DRAWINGS

FIG. 3A shows an exemplary diagram of AV content including one or more CoM tags inserted by any of the devices shown in FIGS. 1 and 2, according to one implementation;

FIG. 3B shows an exemplary diagram of AV content including one or more CoM tags inserted by any of the devices shown in FIGS. 1 and 2, according to another implementation;

FIG. 5 shows a flowchart presenting an exemplary method for use by any of the devices of FIGS. 1 and 2 for performing automated CoM tracking of AV content, according to one implementation.

DETAILED DESCRIPTION

Figure 1:
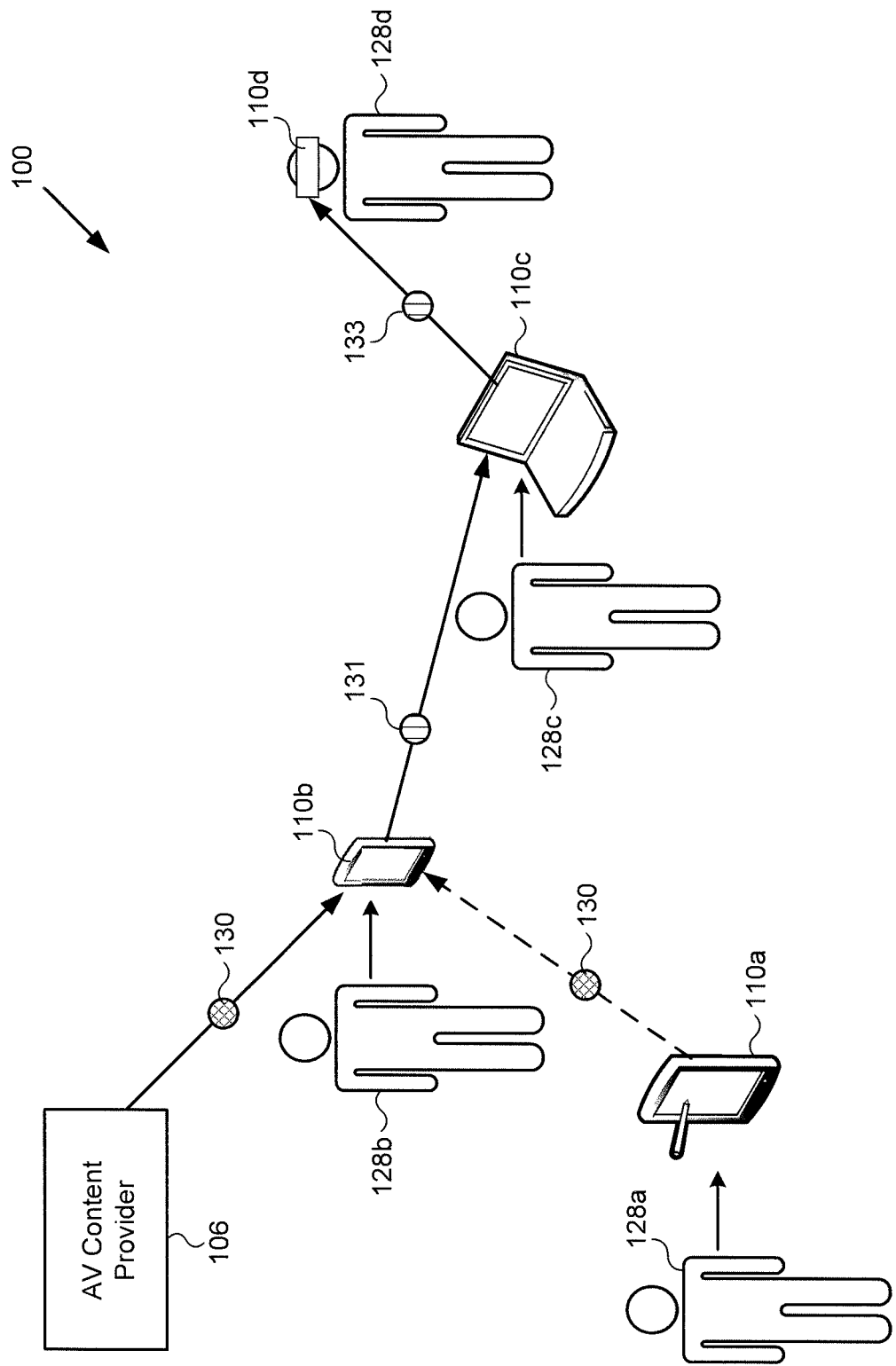
FIG. 1 shows a diagram of an exemplary use case in which an original audio-video (AV) content is manipulated by multiple users, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses devices and methods for use in systems for performing automated chain-of-manipulation (CoM) tracking of audio-video (AV) content that overcome the drawbacks and deficiencies in the conventional art. It is noted that, as used in the present application, the terms "automation," "automated", and "automating" refer to systems and processes that do not require human intervention. Although, in some implementations, a human editor or annotator may evaluate or otherwise review the CoM tracking performed by the devices and according to the processes described herein, that human involvement is optional. Thus, the CoM tracking of AV content provided by the devices and methods described in the present application may be performed under the control of the hardware processing components executing them.

FIG. 1 shows diagram 100 of an exemplary use case in which AV content 130 is manipulated by users 128b and 128c, according to one implementation. Included in FIG. 1 are AV content provider 106, user 128a utilizing device 110a, user 128b utilizing device 110b, user 128c utilizing device 110c, and user 128d utilizing device 110d. Also shown in FIG. 1 are examples of modified AV content 131 and further modified AV content 133.

According to one use case shown by FIG. 1, user 128b may receive AV content 130 from AV content provider 106. AV content provider 106 may be an owner or an owner authorized distributor of AV content 130 in the form of a video (including audio) of a movie, episodic television (TV) content that may include a web series and/or a video log, sports content, news content, or video gaming content, to name a few examples. According to an alternative use case also shown by FIG. 1, user 128b may receive AV content 130 from device 110a controlled by user 128a. In that alternative use case, user 128a may utilize an AV content recording device integrated with device 110a, such as a video camera or cameras of device 110a, to generate AV content 130. When generated by user 128a through use of device 110a, AV content 130 may be an amateur or professional artistic video, or a video of a live event, for example.

It is noted that the depictions of device 110a as a tablet computer, device 110b as a smartphone, device 110c as a laptop computer, and device 110d as a wearable personal communication device are merely exemplary. In various other implementations, one or more of devices 110a, 110b, 110c, and 110d (hereinafter "device(s) 110a-110d") may take the form of a video camera, a desktop computer, a laptop computer, a tablet computer, a gaming console, a smartphone, a smart television (smart TV), or a wearable personal communication device. Moreover, although wearable personal communication device 110d is shown as a headset, such as an augmented reality (AR) or virtual reality (VR) headset or glasses (hereinafter "AR/VR headset or glasses"), that representation is also merely exemplary. In other implementations, any of device(s) 110a-110d may be implemented as a wearable personal communication device in the form of a smartwatch, smart ring, or other smart personal item worn by one or more of users 128a, 128b, 128c, or 128d (hereinafter "users 128a-128d"), or situated in or on clothing worn by one or more of users 128a-128d.

As shown in FIG. 1, user 128b utilizes device 110b to receive AV content 130 from AV content provider 106 or device 110a controlled by user 128a, and may use device 110b to manipulate AV content 130 to produce modified AV content 131. As further shown in FIG. 1, user 128c utilizes device 110c to receive modified AV content 131 from device 110b, and may use device 110c to further manipulate modified AV content 131 to produce further modified AV content 133. User 128d utilizes device 110d to receive modified AV content 131 (produced by user 128b) from device 110c, or further modified AV content 133 (if produced by user 128c) from device 110c.

Manipulation of AV content 130 and modified AV content 131 may be performed through use of respective AV processing applications, such as video recording or editing applications, for example, stored on devices 110b and 110c. The manipulation of AV content 130 or further manipulation of modified AV content 131 may include modification of one or more segments of audio content and/or video content included in AV content 130 and/or modified AV content 131.

Where such a manipulation modifies video content of AV content 130 or modified AV content 131, the manipulation may include one or more of changing the contrast of a video frame, deleting a video frame, inserting a video frame, removing an object from a video frame, inserting an object into a video frame, or changing colors within a video frame, to name a few examples. Where manipulation of AV content 130 or modified AV content 131 modifies audio content of AV content 130 or modified AV content 131, such manipulation may include the deletion of a portion of original audio content and/or the insertion of additional audio content, such as music or speech, for example. Alternatively, or in addition, manipulation of audio content of AV content 130 or modified AV content 131 may include mixing audio tracks, changing the audio level of an audio track, or adding metadata to an audio track.

In the absence of a robust solution for tracking the manipulation of AV content 130 or further manipulation of modified AV content 131, the owner of AV content 130, e.g., AV content provider 106 or user 128a, cannot be assured that the AV content being distributed amongst downstream users 128b-128d is original content or an authorized copy or modification of original content. However, according to implementations of the present application, as described in greater detail below, device(s) 110a-110d are configured for use in a system for tracking the CoM of AV content 130, which includes detecting and tagging the manipulations resulting in modified AV content 131, and may include detecting and tagging the original creation of AV content 130 through use of device 110a.

In some implementations, tags enabling the authentication of original AV content 130 may be inserted in each segment of the AV content. Such authentication tags may include a facility identification tag identifying a production facility at which AV content 130 was created or modified AV content 131 was modified, for example. Other examples of authentication tags may include the Global Positioning System (GPS) location at which AV content 130 was created or modified AV content 131 was modified, a camera type, camera model, and lens parameters used in such a process, as well as the exposure time used to create or modify the content, to name a few.

Figure 2:
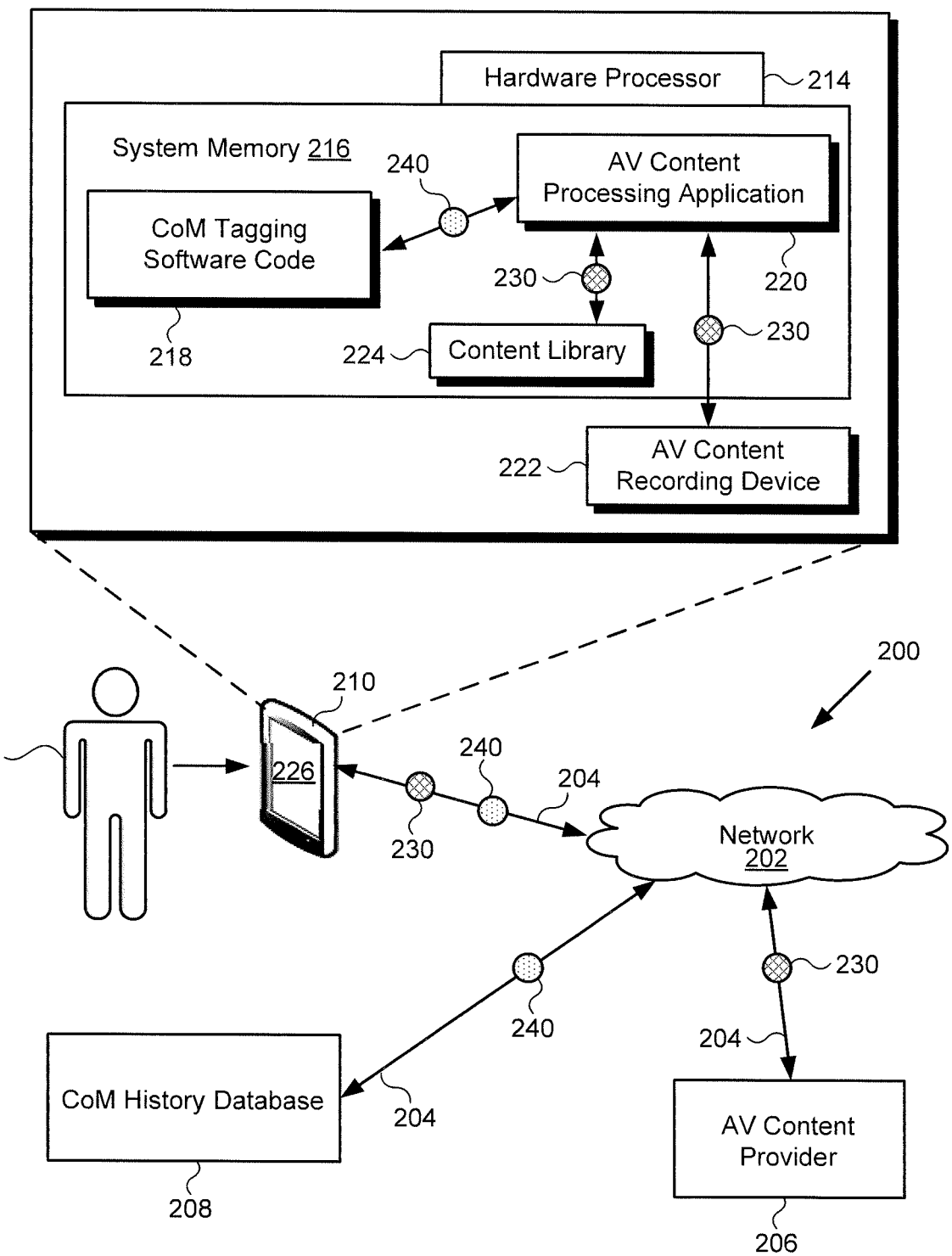
FIG. 2 shows a diagram of an exemplary device for use in a system for performing automated chain-of-manipulation (CoM) tracking of AV content, according to one implementation.

FIG. 2 shows a diagram of exemplary device 210 for use in a system for performing automated CoM tracking of AV content 230, according to one implementation. As shown in FIG. 2, device 210 includes hardware processor 214, AV content recording device 222, system memory 216 implemented as a non-transitory storage device, and display 226. According to the exemplary implementation shown in FIG. 2, system memory 216 stores CoM tagging software code 218, AV content processing application 220, and optional content library 224.

As shown in FIG. 2, device 210 is utilized by user 228 within use environment 200 including communication network 202, AV content provider 206, and optional CoM history database 208. It is noted that, in various implementations, optional CoM history database may take the form of a public or private secure ledger. Examples of such secure ledgers may include Blockchain, Hashgraph, Directed Acyclic Graph (DAG), and Holochain ledgers, to name a few. Also shown in FIG. 2 are one or more CoM tags 240 (hereinafter "CoM tag(s) 240"), network communication links 204 communicatively coupling device 210 with AV content provider 206 and optional CoM history database 208, and AV content 230.

AV content provider 206 and AV content 230 correspond respectively to AV content provider 106 and AV content 130, in FIG. 1. As a result, AV content provider 206 and AV content 230 may share any of the characteristics attributed to respective AV content provider 106 and AV content 130 by the present disclosure, and vice versa. In other words, like AV content provider 106, AV content provider 206 may be an owner or an owner authorized distributor of AV content 230. Moreover, like AV content 130, AV content 230 may take the form of a video and audio clip of a movie, episodic TV content that may include a web series and/or a video log, sports content, news content, or video gaming content delivered by AV content provider 206, or may take the form of amateur or professional artistic video, or a video of a live event, for example, created by user 228 using device 210.

Device 210 and user 228 correspond respectively in general to device(s) 110a-110d and users 128a-128d, respectively, in FIG. 1. That is to say, device(s) 110a-110d may share any of the characteristics attributed to corresponding device 210 by the present disclosure, and vice versa. Thus, although not shown in FIG. 1, device(s) 110a-110d may include features corresponding respectively to hardware processor 214, AV content recording device 222, display 226, and system memory 216 storing CoM tagging software code 218, AV processing application 220, and optional content library 224. In addition, although depicted as a smartphone in FIG. 2, like device(s) 110a-110d, device 210 may take the form of any of a video camera, a desktop computer, a laptop computer, a tablet computer, a gaming console, a smartphone, a smart TV, or a wearable personal communication device such as a smartwatch or AR/VR headset or glasses, for example.

It is noted that although the present application refers to CoM tagging software code 218, AV content processing application 220, and optional content library 224 as being stored in system memory 216 for conceptual clarity, more generally, system memory 216 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 214 of device 210. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Communication network 202 may take the form of a packet-switched network such as the Internet, for example. Alternatively, communication network 202 may correspond to a wide area network (WAN), a local area network (LAN), or be implemented as another type of private or limited distribution network. As noted above, device 210 may be implemented as any of a video camera, a desktop computer, a laptop computer, a tablet computer, a gaming console, a smartphone, a smart TV, or a wearable personal communication device such as a smartwatch or AR/VR headset or glasses, for example. More generally, device 210 may be any suitable mobile or stationary computing devices that implement data processing capabilities sufficient to perform the functionality ascribed to device 210 herein. Furthermore, display 226 of device 210 may be implemented as a liquid crystal display (LCD), a light-emitting diode (LED) display, an organic light-emitting diode (OLED) display, or any other suitable display screen that performs a physical transformation of signals to light.

FIG. 3A shows an exemplary diagram of modified AV content 331 including one or more CoM tags 340 (hereinafter "CoM tag(s) 340") inserted by device 110b, according to one implementation, while FIG. 3B shows modified AV content 331 according to another implementation. Modified AV content 331 corresponds in general to modified AV content 131 in FIG. 1. As a result, modified AV content 331 may share any of the characteristics attributed to corresponding modified AV content 131 by the present disclosure, and vice versa. Moreover, CoM tag(s) 340, in FIGS. 3A and 3B, correspond in general to CoM tag(s) 240, in FIG. 2, and those features can share any of the characteristics attributed to either corresponding feature by the present disclosure (described in further detail below with reference to FIG. 4).

As shown in FIG. 3A, modified AV content 331 includes timecode 336, and segments 332a and 332b each including a sequence of video frames. Thus, segment 332a of modified AV content 331 may include video frames 334a, 334b, 334c, and 334d (hereinafter "frame sequence 334a-334d"), while segment 332b of modified AV content 331 may include video frames 334e, 334f, 334g, and 334h (hereinafter "frame sequence 334e-334h"). It is noted that although FIG. 3A depicts each of segments 332a and 332b as including four video frames, that representation is merely exemplary. In other implementations, the number of video frames in segments 332a and 332b may differ, and may number as few as one, or more than the four frames shown in FIG. 3A.

As further shown in FIG. 3A, in some implementations, when manipulation of original AV content results in modification of one or more video frames of frame sequence 334a-334d and/or frame sequence 334e-334h, one or more CoM tag(s) 340 track modification of the one or more video frames, and is/are inserted in a single frame of respective segment 332a and/or segment 332b. According to the exemplary implementation shown in FIG. 3A, for example, modification of any video frame of frame sequence 334a-334d results in CoM tag(s) 340 only being inserted into the first video frame of segment 332a (i.e., video frame 334a). Analogously, modification of any video frame of frame sequence 334e-334h results in CoM tag(s) 340 only being inserted into the first video frame of segment 332b (i.e., video frame 334e).

It is noted that insertion of CoM tag(s) 340 into video frame 334a and 334e is merely exemplary, in other implementations, CoM tag(s) 340 may be inserted into one of video frames 334b, 334c, or 334d of segment 332a, and/or one of video frames 334f, 334g, or 334h of segment 332b, instead of being inserted into video frame 334a and/or video frame 334h, respectively. Thus, in implementations in which segments 332a and 332b include a sequence of video frames, CoM tag(s) 340 may be inserted into any video frame of the sequence of video frames such as a first video frame, a second or subsequent video frame, the last video frame, the video frame that has been modified, etc. Moreover, in use cases where no frame of a particular segment is modified, CoM tag(s) 340 would not be inserted into that segment. For example, if no frame of frame sequence 334e-334h is modified, segment 332b would not be tagged by CoM tag(s) 340.

In some implementations in which segments 332a and 332b include a sequence of video frames, CoM tag(s) 340 may be selectively inserted into a "key frame" or I-frame (hereinafter "I-frame") of the sequence of video frames. As known in the art, an I-frame refers to an "intra-coded picture" that includes all the information necessary to specify its content. By contrast, an accompanying "predicted picture" P-frame includes only differences from the previous frame, while a "bidirectional predicted picture" B-frame includes only differences from both the previous and subsequent frames.

By contrast to FIG. 3A, according to the implementation shown in FIG. 3B, each segment of modified AV content 331 includes only a single frame of video. Thus, segment 332a includes single video frame 334a, segment 332b includes single video frame 334b, and so forth. Thus, according to the implementation shown in FIG. 3B, each of video frames 334a, 334b, 334c, 334d, 334e, 334f, 334g, and 334h (hereinafter "video frames 334a-334h") is a separate content segment. Moreover, according to the exemplary implementation shown in FIG. 3B, only video frames 334a, 334c, 334d, and 334g have been modified as a result of manipulation of original AV content. Therefore, only video frames 334a, 334c, 334d, and 334g have CoM tag(s) 340 inserted therein according to the implementation shown in FIG. 3B.

It is reiterated that manipulation of original AV content (e.g., AV content 130/230) by results in the creation of modified AV content (e.g., modified AV content 131/331). Like modified AV content 331, original AV content (e.g., AV content 130/230) may include timecode 336 and video frames 334a-334h segregated into multiple segments corresponding respectively to segments 332a and 332b. Moreover, each of those segments may include sequences of video frames, or only a single video frame. It is further noted that the representation shown in FIGS. 3A and 3B show modification of video content but not audio content included in original AV content for conceptual clarity. However, original AV content may include both audio content and video content, and modifications to audio content included in original AV content may be tracked using CoM tag(s) in a manner analogous to that shown in FIGS. 3A and 3B for video content.

Figure 4:
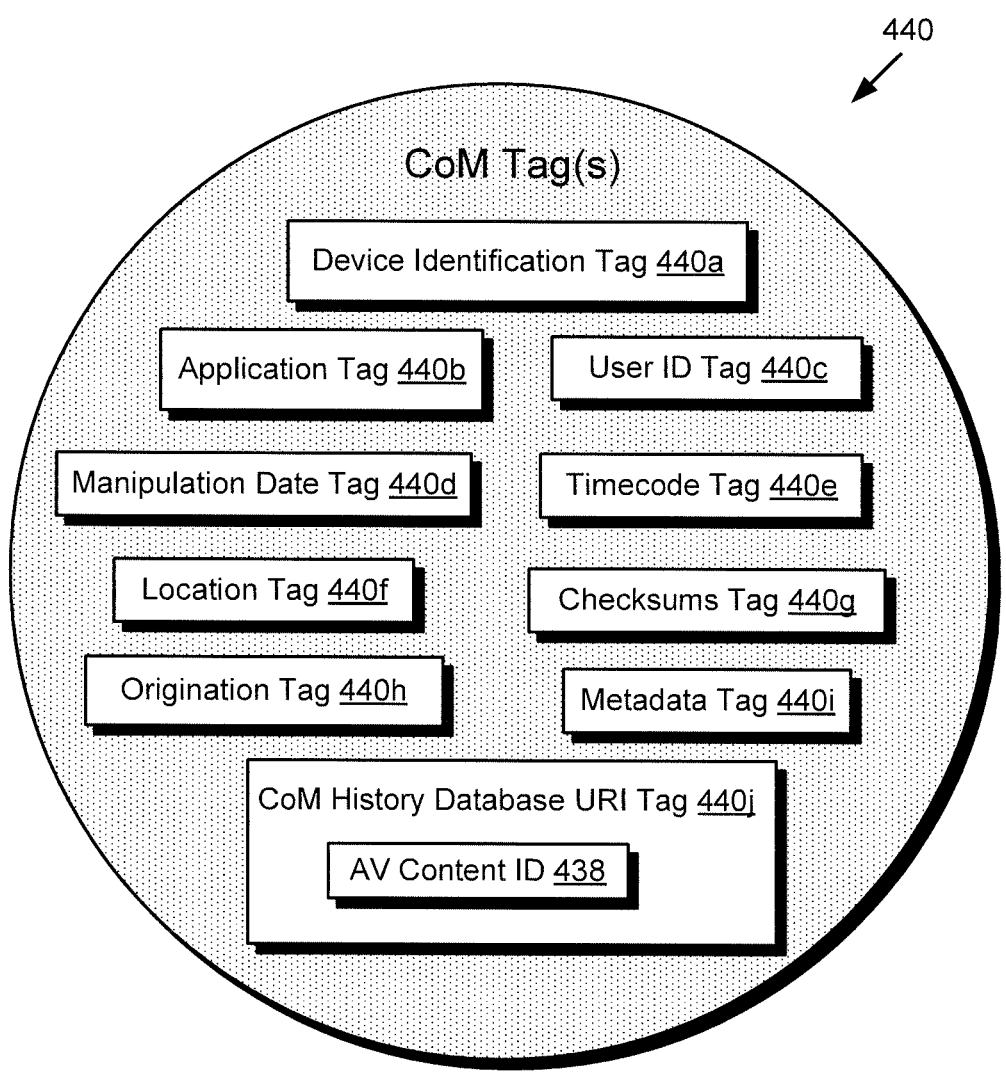
FIG. 4 shows an exemplary representation of CoM tags suitable for use by any of the devices in FIGS. 1 and 2, according to one implementation.

FIG. 4 shows an exemplary representation of one or more CoM tags 440 (hereinafter "CoM tag(s) 440") suitable for use by device(s) 110a-110d/210, according to one implementation. As shown in FIG. 4, CoM tag(s) 440 may include one or more of device identification tag 440a, application tag 440b, user ID tag 440c, manipulation date tag 440d, timecode tag 440e, location tag 440f, checksums tag 440g, origination tag 440h, and metadata tag 440i. Moreover, and as further shown in FIG. 4, in some implementations, CoM tag(s) 440 may further include CoM history database universal resource locator (URI) tag 440*j* including AV content ID 438.

Device identification tag 440*a* identifies device 110*b* used for modifying AV content 130/230. Application tag 440*b* identifies AV processing application 220 used for modifying AV content 130/230. User ID tag 440*c* identifies a user performing the manipulation of AV content 130/230, while manipulation date tag 440*d* is the date when the manipulation of AV content 130/230 occurs. Timecode tag 440*e* identifies the position or positions on timecode 336 at which modifications to AV content 130/230 is made, while location tag 440*f* may include GPS or other data identifying a geographical location of device 110*b* when used for modifying AV content 130/230.

Origination tag 440*h* may include one or more tags identifying an original author of AV content 130/230, an original creating device of AV content 130/230, one or more applications used to create AV content 130/230, or a creation data of AV content 130/230. Metadata tag 440*i* may be metadata included in AV content 130/230 or may be metadata further describing distinctions between modified AV content and original AV content. Checksums tag 440*g* may include internal security and/or verification data included in AV content 130/230. For example, a numerical value may be associated with each of CoM tag(s) 440, and those values may be summed to generate checksums tag 440*g*. Any subsequent unauthorized modification to a segment of AV content 130/230 would cause the checksum for that segment to change relative to checksums tag 440*g* for that segment. In one implementation, checksums tag 440*g* may be a sum of values of one or more CoM tag(s) 440 of a segment, pixel values of the segment, or values of any other data or information associated with the segment.

CoM tag(s) 440 correspond in general to CoM tag(s) 240/340 in FIGS. 2, 3A, and 3B. Consequently, CoM tag(s) 240/340 may share any of the characteristics attributed to corresponding CoM tag(s) 440 by the present disclosure, and vice versa. That is to say, although not shown in FIGS. 2, 3A, and 3B, like CoM tag(s) 440, CoM tag(s) 240/340 may include one or more of device identification tag 440*a*, application tag 440*b*, user ID tag 440*c*, manipulation date tag 440*d*, timecode tag 440*e*, location tag 440*f*, checksums tag 440*g*, origination tag 440*h*, metadata tag 440*i*, and CoM history database URI tag 440*j* including AV content ID 438.

The functionality of device(s) 110*a*-110*d*/210 including CoM tagging software code 218 will be further described by reference to FIG. 5, in combination with FIGS. 1, 2, 3A, 3B, and 4. FIG. 5 shows flowchart 560 presenting an exemplary method for use by a device for performing automated CoM tracking of AV content, according to one implementation. With respect to the method outlined in FIG. 5, it is noted that certain details and features have been left out of flowchart 560 in order not to obscure the discussion of the inventive features in the present application.

Referring now to FIG. 5 in combination with FIGS. 1 and 2, flowchart 560 begins with detecting manipulation of AV content 130/230 by AV processing application 220 modifying AV content 130, wherein the manipulation of AV content 130/230 modifies at least one of video content or audio content of AV content 130/230 (action 562). As noted above, in some implementations AV content 130/230 may be received by device 110*b*/210 from AV content provider 106/206, which may be an owner entity or an owner authorized distributor of AV content 130/230. Alternatively, AV content 130/230 may be received by device(s) 110*b*110*d*/ 210 from another user, such as another one or more of users 128*a*-128*c*/228. For example, AV content 130/230 may be received by device 110*b*/210 from AV content provider 106/206 or by device(s) 110*b*-110*d*/210 from another of user(s) 128*a*-128*c*/228 via communication network 202 and network communication links 204. As yet another alternative, AV content 130/230 may be stored locally on device(s) 110*a*-110*d*/210, and may be retrieved from optional content library 224.

As further noted above, user 128*b* may use device 110*b*/ 210 to manipulate AV content 130/230 to produce modified AV content 131/331. The manipulation of AV content 130/230 may include modification of one or more segments 332*a*/332*b* of content included in AV content 130/230. Where such a manipulation modifies video content of AV content 130/230, the manipulation may include one or more of changing the contrast of one or more of video frames 334*a*-334*h*, deleting one or more of video frames 334*a*-334*h*, inserting one or more of video frames 334*a*-334*h*, removing an object from one or more of video frames 334*a*-334*h*, inserting an object into one or more of video frames 334*a*-334*h*, or changing colors within one or more of video frames 334*a*-334*h*, to name a few examples. Where such a manipulation modifies audio content of AV content 130/230, the manipulation may include the deletion of a portion of original audio content and/or the insertion of additional audio content, such as music or speech, for example. Alternatively, or in addition, manipulation of audio content of AV content 130/230 may include mixing audio tracks, changing the audio level of an audio track, or adding metadata to an audio track.

Alternatively, and as also noted above, in some implementations, user(s) 128*a*-128*d*/228 may utilize AV content recording device 222 integrated with respective device(s) 110*a*-110*d*/210, such as a video camera or cameras for example, to create or manipulate AV content 130/230. For example, and as shown in FIGS. 1 and 2, user 128*a*/228 may utilize AV content recording device 222 integrated with device 110*a*/210 to create AV content 130/230, while user 128*b*/228 may utilize AV content recording device 222 integrated with device 110*b*/210 to modify AV content 130/230.

The creation or manipulation of AV content 130/230 described above may be performed through use of AV processing application 220, which may be a video recording or editing application, for example, stored in system memory 216. Detection of that manipulation, in action 562, may be performed by CoM tagging software code 218, executed by hardware processor 214. For example, as shown in FIG. 2, CoM tagging software code 218 is interactively coupled to AV content processing application 220. As a result, use of AV content processing application 220 by device 110*a*/210 to create original AV content 130/230, as well as use of AV content processing application 220 by device 110*b*/210 to modify original AV content 130/230 may be detected through communications between AV content processing application 220 and CoM tagging software code 218.

Continuing to refer to the specific example in which original AV content 130/230 is modified by device 110*b*/210, flowchart 560 continues with generating, when the manipulation by AV processing application 220 is detected, CoM tag(s) 240/340/440 including device identification tag 440*a* identifying device 110*b*/210 used for modifying AV content 130/230 (action 564). It is noted that CoM tag(s) include at least device identification tag 440*a*, but may include one or more additional tags or data. For example, and as discussed above, in addition to device identification tag 440*a*, CoM tag(s) 240/340/440 may further include one or more of application tag 440*b*, user ID tag 440*c*, manipulation date tag 440*d*, timecode tag 440*e*, location tag 440*f*, checksums tag 440*g*, origination tag 440*h*, metadata tag 440*i*, and CoM history database URI tag 440*j* including AV content ID 438.

Generation of CoM tag(s) 240/340/440 including device identification tag 410 identifying device 110*b*/210 used for modifying AV content 130/230, in action 564, may be performed by CoM tagging software code 218, executed by hardware processor 214 of device 110*b*/210 used to modify AV content 130/230. For example, mobile communication devices such as smartphones typically have a unique device identification number distinct from the serial numbers assigned respectively to its hardware components. In one implementation, hardware processor 214 may execute CoM tagging software code 218 to read that device identification number and generate device identification tag 410 including that number.

Flowchart 560 can conclude with inserting, in each of modified segments 332*a*/332*b* of AV content 131/231 modified by AV processing application 220, CoM tag(s) 240/340/440 generated in action 564 (action 566). Action 566 may be performed by CoM tagging software code 218, executed by hardware processor 214. With respect to CoM tag(s) 240/340/440, it is noted that those tag(s) is/are persistent tags that cannot be altered by user(s) 128*a*-128*d*/228 after insertion into modified segments of AV content 131/231 modified by AV processing application 220. It is further noted that CoM tag(s) 240/340/440 are human and machine imperceptible when modified AV content 131/231 is played back by a playback device of device(s) 110*a*-110*d*/210 on display 226.

It is noted that any modifications to AV content 130/230 by an unauthorized agent would be made using a content processing application not monitored by CoM tagging software code 218. As a result, those unauthorized modifications would be untagged. However, any modification made to AV content 130/230 results in a change in the checksum of each modified segment. Consequently, in implementations in which checksums tag 440*g* is included among CoM tag(s) 240/340/440, any modifications made to a segment of AV content 130/230 by an unauthorized agent results in the checksum for that segment failing to match checksum(s) tag 440*g*, thereby identifying the content as invalid.

In many implementations, it may be advantageous or desirable for CoM tag(s) 240/340/440 inserted into modified AV content 131/231 to include all CoM tracking data. That is to say, in those implementations modified AV content 131/331 carries all information tracking modifications made to AV content 130/230 in its original state. However, in some implementations, some or substantially all of that tracking information may be stored remotely from device(s) 110*a*-110*d*/210, on CoM history database 208, which may be implemented as a CoM history secure or distributed ledger such as, but not limited to, one of a Blockchain, Hashgraph, DAG, or Holochain ledger, for example.

In implementations in which some or substantially all of the CoM tracking information carried by CoM tag(s) 240/340/440 is stored on CoM history database 208, CoM tag(s) 240/340/440 other than device identification tag 410 and CoM history database URI tag 408 including AV content ID 438 may be transferred to CoM history database 208, as shown in FIG. 2.

Although not included in the exemplary outline provided by flowchart 560, in some implementations, the present method may further include rendering AV content 130/230 created by device 110*a*210 and/or modified AV content 131/231 produced by device 110*b*/210 on display 226. As noted above, display 226 may be implemented as an LCD, an LED display, an OLED display, or any other suitable display screen that performs a physical transformation of signals to light. Rendering of AV content 130/230 created by device 110*a*/210 and/or modified AV content 131/231 produced by device 110*b*/210 on display 226 may be performed using AV content processing application 218, executed by hardware processor 214.

CoM tag(s) 240/340/440 inserted into AV content 130/230 created by device 110*a*210 and/or modified AV content 131/231 produced by device 110*b*/210 may advantageously be used by AV content provider 106/206 to validate the authenticity of AV content 130/230 and/or modified AV content 131/231. For example, AV content provider 106/206 or an authorized third party authenticator acting on behalf of AV content provider 106/206 may analyze the CoM history recorded by CoM tag(s) 240/340/440 to identify the entity that created or initiated distribution of AV content 130/230, as well as any and all modifications made to AV content 130/230 and resulting in modified AV content 131/231.

Thus, the present application discloses robust solutions for performing automated CoM tracking of AV content that overcome the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A device for use in a system for tracking a chain-of-manipulation (CoM) of an audio-video (AV) content having a plurality of segments, the device comprising:
    a hardware processor;
    a system memory; and
    a CoM tagging software code and an AV processing application stored in the system memory;
    the hardware processor configured to execute the CoM tagging software code to:
        detect a modification of the AV content by the AV processing application, wherein the modification modifies at least one of a video content or an audio content of one or more segments of the AV content;
        generate, after detecting the modification of the AV content by the AV processing application, one or more CoM tags to track the modification, wherein the one or more CoM tags include a device identification tag identifying the device which performed the modification of the AV content; and
        insert the one or more CoM tags in the one or more modified segments of the AV content modified by the AV processing application, wherein at least one CoM tag is inserted in each of the one or more modified segments, wherein the inserted one or more CoM tags are human and machine imperceptible when the AV content is played back by a playback device on a display.

2. The device of claim 1, wherein the one or more CoM tags further include an application tag identifying the AV processing application which performed the modification of the AV content.

3. The device of claim 1, wherein the modification of the AV content modifying the at least one of the video content or the audio content includes at least one of changing a contrast of a video frame, deleting a video frame, inserting a video frame, removing an object from a video frame, inserting an object into a video frame, changing one or more colors within a video frame, deleting a portion of original audio content, inserting additional audio content, mixing audio tracks, changing an audio level of an audio track, or adding metadata to an audio track.

4. The device of claim 1, wherein the one or more CoM tags further include at least one origination tag identifying at least one of an original author of the AV content, an original creating device used to create the AV content, at least one application used to create the AV content, or a creation date of the AV content.

5. The device of claim 1, wherein the one or more CoM tags further include at least one of a date of the modification of the AV content or an identification of a user performing the modification of the AV content.

6. The device of claim 1, wherein each of the one or more modified segments of the AV content modified by the AV processing application comprises a sequence of video frames, and wherein the one or more CoM tags are inserted in a single frame of the sequence of video frames.

7. The device of claim 6, wherein the single frame is an I-frame of the sequence of video frames.

8. The device of claim 1, wherein each of the one or more modified segments of the AV content modified by the AV processing application comprises a single frame of video.

9. A method for use by a device for tracking a chain-of-manipulation (CoM) of an audio-video (AV) content having a plurality of segments, the device including a hardware processor and a system memory storing a CoM tagging software code and an AV processing application, the method comprising:

detecting, by the CoM tagging software code executed by the hardware processor, a modification of the AV content by the AV processing application, wherein the modification modifies at least one of a video content or an audio content of one or more segments of the AV content;

generating, by the CoM tagging software code executed by the hardware processor after detecting the modification of the AV content by the AV processing application, one or more CoM tags to track the modification, wherein the one or more CoM tags include a device identification tag identifying the device which performed the modification of the AV content; and inserting, by the CoM tagging software code executed by the hardware processor, the one or more CoM tags in the one or more modified segments of the AV content modified by the AV processing application, wherein at least one CoM tag is inserted in each of the one or more modified segments, wherein the inserted one or more CoM tags are human and machine imperceptible when the AV content is played back by a playback device on a display.

10. The method of claim 9, wherein the one or more CoM tags further include an application tag identifying the AV processing application which performed the modification of the AV content.

11. The method of claim 9, wherein the modification of the AV content modifying the at least one of the video content or the audio content includes at least one of changing a contrast of a video frame, deleting a video frame, inserting a video frame, removing an object from a video frame, inserting an object into a video frame, changing one or more colors within a video frame, deleting a portion of original audio content, inserting additional audio content, mixing audio tracks, changing an audio level of an audio track, or adding metadata to an audio track.

12. The method of claim 9, wherein the one or more CoM tags further include at least one origination tag identifying at least one of an original author of the AV content, an original creating device used to create the AV content, at least one application used to create the AV content, or a creation date of the AV content.

13. The method of claim 9, wherein the one or more CoM tags further include at least one of a date of the modification of the AV content or an identification of a user performing the modification of the AV content.

14. The method of claim 9, wherein each of the one or more modified segments of the AV content modified by the AV processing application comprises a sequence of video frames, and wherein the one or more CoM tags are inserted in a single frame of the sequence of video frames.

15. The method of claim 14, wherein the single frame is an I-frame of the sequence of video frames.

16. The method of claim 9, wherein each of the one or more modified segments of the AV content modified by the AV processing application comprises a single frame of video.

17. The device of claim 1, wherein the hardware processor is configured to execute the CoM tagging software code to automatically generate the one or more CoM tags.

18. The device of claim 1, wherein the one or more CoM tags further include a checksum tag.

19. The method of claim 9, wherein generating the one or more CoM tags is performed automatically.

20. The method of claim 9, wherein the one or more CoM tags further include a checksum tag.

* * * * *